(12) United States Patent
Kuchi et al.

(10) Patent No.: US 10,257,776 B2
(45) Date of Patent: Apr. 9, 2019

(54) METHOD OF PERFORMING CELL SEARCH BY USER EQUIPMENT (UE)

(71) Applicant: INDIAN INSTITUTE OF TECHNOLOGY HYDERABAD, Sangareddy (IN)

(72) Inventors: Kiran Kumar Kuchi, Hyderabad (IN); Sriharsha Magani Ramarao, Hyderabad (IN); Sreekanth Dama, Hyderabad (IN)

(73) Assignee: INDIAN INSTITUTE OF TECHNOLOGY, Hyderabad, Kandi, Sangareddy, TS (IN)

( * ) Notice: Subject to any disclaimer, the term of this patent is extended or adjusted under 35 U.S.C. 154(b) by 0 days.

(21) Appl. No.: 15/341,276

(22) Filed: Nov. 2, 2016

(65) Prior Publication Data
US 2018/0077630 A1    Mar. 15, 2018

(30) Foreign Application Priority Data
Sep. 14, 2016   (IN) .............................. 201641031296

(51) Int. Cl.
H04W 56/00    (2009.01)
H04W 48/16    (2009.01)
H04W 24/02    (2009.01)

(52) U.S. Cl.
CPC ........... *H04W 48/16* (2013.01); *H04W 24/02* (2013.01); *H04W 56/001* (2013.01)

(58) Field of Classification Search
CPC . H04W 48/16; H04W 24/10; H04W 52/0206; H04W 56/0015; H04W 72/0466; H04W 88/02; H04W 56/0035; H04W 56/0085; H04W 24/02; H04W 56/001; H04L 27/2659; H04L 5/0007; H04L 7/0016; H04L 1/0026; H04B 17/309; H04B 17/336; H04B 7/0619
See application file for complete search history.

(56) References Cited

U.S. PATENT DOCUMENTS

| | | | | |
|---|---|---|---|---|
| 2014/0302867 A1* | 10/2014 | Mizusawa | ............ | H04W 16/16 455/452.1 |
| 2014/0321450 A1* | 10/2014 | Zhang | ................... | H04L 7/0016 370/350 |
| 2015/0223245 A1* | 8/2015 | Cheng | ................... | H04W 48/16 370/329 |

FOREIGN PATENT DOCUMENTS

EP           1662738        *    6/2006

* cited by examiner

*Primary Examiner* — Quan M Hua

(57) ABSTRACT

Embodiments herein provide a method of performing a cell search by user equipment (UE). The method includes receiving a signal from the base station. The method includes estimating a fractional frequency offset (FFO) along with a coarse timing using a cyclic prefix (CP) in the received signal. The method includes compensating the received signal with the estimated FFO. Further, the method includes applying a correlation on the compensated received signal with each of a plurality of primary synchronization signals (PSSs) generated by the UE. Furthermore, the method includes determining a plurality of cell search parameters based on the applied correlation.

8 Claims, 4 Drawing Sheets

100

Base station 102

Signal →

User equipment (UE) 104

Receiver 104a

Cell search

METHOD OF PERFORMING CELL SEARCH BY USER EQUIPMENT (UE)

FIELD OF INVENTION

The embodiments herein relates to wireless communication network and more particularly to a method for performing cell search by a user equipment (UE) in the wireless communication network. The present application is based on, and claims priority from an Indian Application Number 201641031296 filed on 14 Sep. 2016, the disclosure of which is hereby incorporated by reference herein.

BACKGROUND OF INVENTION

The Long-term evolution (LTE) is a wireless standard which serves a large number of user equipments (UEs) and supports a wide range of bandwidths. The LTE standard uses a minimum bandwidth of 180 KHz for communication with the devices. In downlink (DL), the LTE uses orthogonal frequency division multiple access (OFDMA) and single-carrier FDMA (SC-FDMA) in uplink (UL).

In LTE system, an evolved universal terrestrial radio access network (E-UTRAN) includes a plurality of base stations, known as evolved Node-Bs (eNBs), communicating with a plurality of user equipments (UEs). The plurality of UEs communicates with a base station (BS) or an eNB through the DL and the UL. Cell search and synchronization in the LTE system is performed by the UEs using both the Primary Synchronization Signal (PSS) and Secondary Synchronization Signal (SSS).

The dedicated channel for synchronization in LTE is further divided into two parts namely Primary Synchronization channel (PSCH) and Secondary synchronization channel (SSCH). The signals transmitted on PSCH and SSCH are Primary synchronization Sequence (PSS) which carry sector ID (SID) and Secondary synchronization sequence (SSS) which carry Group ID (GID) respectively. The BS ID is obtained by combining the IDs on PSS and SSS. In order to detect the BS ID, the UEs have to extract the information from both the synchronization channels properly.

Under the process of cell search, information including BS ID, timing and frequency related to the BS has to be acquired by the UEs. The BS ID identification operation is said to be completed once the UEs perform the actions such as acquisition of the symbol and frame timing, carrier frequency offset (CFO) estimation and extracting the BS ID. In order to perform these actions accurate synchronization of the channel is essential in both time and frequency domain.

In an existing method, synchronization of the channel is achieved through an estimator which makes use of pilots which are broadcasted periodically. The pseudo noise (PN) sequences are used as pilots to generate an orthogonal frequency division multiplexing (OFDM) symbol, whose first and second halves in time domain are identical (i.e., second half is replica of the first half). Assuming the channel is same in the two halves of the OFDM symbol, the auto-correlation of N=2 windows with its replica, provides the estimates of frame timing and frequency offsets. This method is however not adoptable, since the nature of the pilot structure which is entirely different. Further, applying this method between the two synchronization signals is also not viable because of the distance between channels, which are separated by 5 milli-seconds (msecs). The channel cannot be assumed to be unaltered for a period of 5 msecs.

In another existing method, a maximum-likelihood (ML) estimator is used for timing and fractional frequency offset (FFO) estimation using cyclic prefix (CP) present in each symbol. This is accomplished by the autocorrelation of CP with its replica in the symbol. The ML estimator is used to determine the coarse timing. For better estimates, this can be averaged over multiple symbols. However, the ML estimator is prone to the effects of the delay spread. In the ML estimator, the noise terms are present in both the correlating samples, yielding more noise terms in the product, since it is an auto-correlation on the received signal.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method for performing cell search by user equipment (UE).

Another object of the embodiments herein is to provide a method for reducing complexity in performing the cell search by using the filters and decimators.

Accordingly the embodiments herein provide a method of performing a cell search by user equipment (UE). The method includes receiving a signal from the base station. The method includes estimating a fractional frequency offset (FFO) along with a coarse timing using a cyclic prefix (CP) in the received signal. The method includes compensating the received signal with the estimated FFO. Further, the method includes applying a correlation on the compensated received signal with each of a plurality of primary synchronization signals (PSSs) generated by the UE. Furthermore, the method includes determining a plurality of cell search parameters based on the applied correlation.

In an embodiment, the cell search parameters include a PSS ID, PSS timing, a length of CP and a mode of operation of the cell.

In an embodiment, the PSS ID is determined by identifying a maximum value.

In an embodiment, the PSS timing is determined by identifying a position associated with the maximum value.

The method includes identifying the maximum value and the position associated with the maximum value includes forming a matrix by correlating the compensated received signal with each of the PSSs. The matrix is formed for each CP. Further, the maximum value and the position associated with the maximum value are determined in the matrix.

The method includes extracting a cell identity (ID) based on the PSS ID and the PSS timing. The method includes identifying the length of the CP for which the maximum value is determined in the matrix.

In an embodiment, the method includes determining that the cell search parameters are unavailable. The method includes applying a correlation on the received signal with each of the plurality of primary synchronization signals (PSSs) to eliminate each value from a candidate set of values considered for integer frequency offset (IFO). The method includes determining the plurality of cell search parameters based on the correlation.

The method includes forming a matrix by correlating the received signal with each of the PSSs with a value among the candidate set of values. The method includes applying the correlation on the received signal with each of the PSSs with each value among the set of values. The method includes placing samples obtained from each correlation in the matrix.

The method includes obtaining a finite interval for estimating a fractional frequency offset (FFO). The method includes segmenting the finite interval into a plurality of segments. The method includes applying correlation with the PSS ID for obtaining a maximum value to determine the FFO.

Accordingly the embodiments herein provide user equipment (UE) for performing cell search. The UE includes a receiver configured to receive a signal from a base station. The receiver is configured to estimate a fractional frequency offset (FFO) along with a coarse timing using a cyclic prefix (CP) in the received signal. The receiver is configured to compensate the received signal with the estimated FFO. Further, the receiver is configured to apply a correlation on the compensated received signal with each of a plurality of primary synchronization signals (PSSs) generated by the UE. Furthermore, the receiver is configured to determine a plurality of cell search parameters based on the applied correlation.

These and other aspects of the embodiments herein will be better appreciated and understood when considered in conjunction with the following description and the accompanying drawing. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
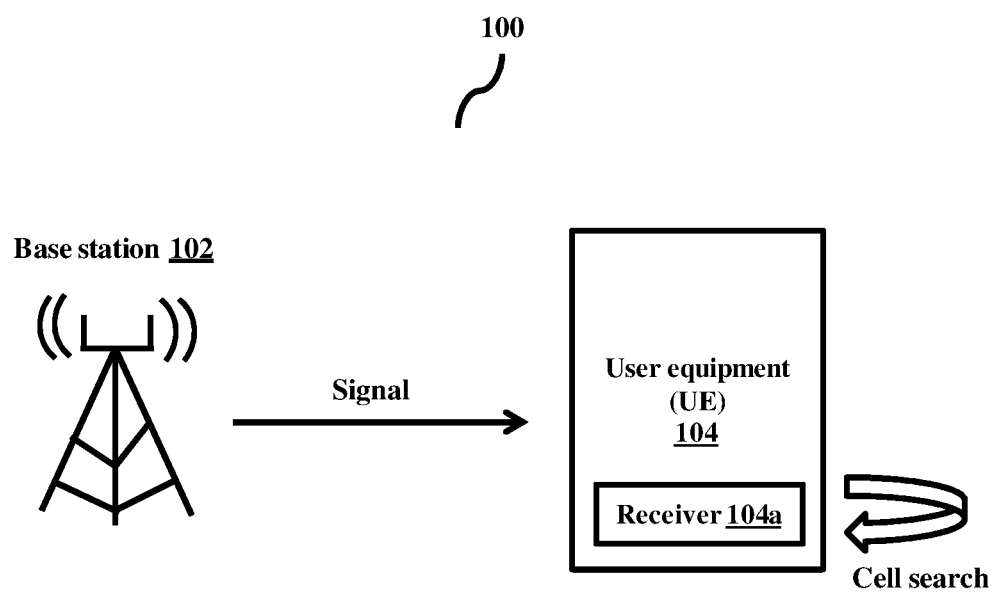
FIG. 1 illustrates a wireless communication network in which a user equipment (UE) performs cell search, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a method of performing a cell search by user equipment (UE). The method includes receiving a signal from the base station. The method includes estimating a fractional frequency offset (FFO) along with a coarse timing using a cyclic prefix (CP) in the received signal. The method includes compensating the received signal with the estimated FFO. Further, the method includes applying a correlation on the compensated received signal with each of a plurality of primary synchronization signals (PSSs) generated by the UE. Furthermore, the method includes determining a plurality of cell search parameters based on the applied correlation.

In an embodiment, cell search parameters include a PSS ID, PSS timing, a length of CP and a mode of operation of the cell.

In an embodiment, the PSS ID is determined by identifying a maximum value.

In an embodiment, the PSS timing is determined by identifying a position associated with the maximum value.

The method includes forming a matrix by correlating the compensated received signal with each of the PSSs. The matrix is formed for each CP. Further, the method includes determining a maximum value and a position associated with the maximum value in the matrix.

Unlike the conventional mechanisms, the proposed method is low complex and robust to perform the cell search and synchronization by the UE. The proposed method utilizes filters and decimators to reduce the complexity of the receiver which performs the cell search and synchronization. The proposed method can be switched based on RF impairments (due to presence of integer frequency offset) and channel effects for identifying the cell search parameters.

Referring now to the drawings and more particularly to FIGS. 1 through 4 where similar reference characters denote corresponding features consistently throughout the figures, there are shown preferred embodiments.

FIG. 1 illustrates a wireless communication network 100 in which a user equipments (UE) performs cell search, according to the embodiments as disclosed herein. As depicted in the FIG. 1, the wireless communication network 100 includes a base station 102 and a UE 104. In an embodiment, the base station 102 is an evolved node base station (eNB). The base station 102 has a unique identifier (i.e., a base station ID), which has to be extracted by the UE 104 by performing the cell search. The UE 104 includes a receiver 104a. The receiver 104a performs cell search when the UE 104 is powered ON. The method of performing the cell search by the receiver 104a is as described herein.

The base station 102 transmits the signal to the UE 104. The transmitted signal x(n) by the base station 102 is an OFDM modulated signal obtained by placing symbols X(k) on subcarrier k. Each X(k) could be any complex modulated symbol and the OFDM modulation over X(K) is achieved by N point IFFT.

$$x(t) = \sum_{k=-N/2}^{-1} X(k) e^{\frac{j2\pi k(i-N_{CP}T_s)}{NT_s}} + \sum_{k=1}^{N/2} X(k) e^{\frac{j2\pi k(i-N_{CP}T_s)}{NT_s}} \quad (1)$$

The time domain based continuous signal y(t) received by the UE 104 through a wireless medium includes effects of channel and frequency offset. The time domain based continuous signal y(t) can be represented as $$y(t) = (x(t) * h(n))e^{j2\pi \Delta f t} + w(t) \quad (2)$$

In an embodiment, the received signal y(t) is sampled with a corresponding sampling rate, the discrete time domain signal can be obtained as $$y(n) = (x(n) \otimes h(n))e^{\frac{j2\pi \epsilon n}{N}} + w(n) \quad (3)$$

In the above equation (3), ε is normalized frequency offset with reference to sub carrier spacing. The causes for frequency offset includes mismatch between oscillators at the base station 102 and the UE 104 and Doppler shift. The normalized frequency offset can be denoted as $$\epsilon = \frac{\Delta f}{1/(NT_s)} \quad (4)$$

'ε' can be any real value and can be divided as integer and fractional parts, where integer part of frequency offset is called integer frequency offset and fractional part is called fractional frequency offset (FFO). The normalized frequency offset is estimated and compensated by locating the PSS and SSS symbol in a frame.

The receiver 104a decimates the received signal y(n) and performs cell search.

In an embodiment, the received signal y(n) is allowed to pass through a low pass filter (LPF) by ensuring that no portion of the PSS and SSS is lost due to decimation. In an example, a generalized Butterworth filter is selected as the LPF. The filtered output of y(n) is obtained at the output of the LPF.

In an embodiment, the coarse timing and FFO are estimated using CP in the received signal. In an example, maximum likelihood (ML) estimator can be used for estimating the coarse timing and the FFO. The coarse timing estimate and FFO can be averaged over multiple symbols for achieving better estimate. The coarse timing estimate and the FFO are obtained from log likelihood function according to the set of equations ad mentioned below.

$$\tilde{T} = \underset{\theta}{\mathrm{argmax}}\{2\gamma(\theta) - \rho\varepsilon(\theta)\} \quad (5)$$

$$\hat{\epsilon}f = \angle\gamma(\hat{\theta}) \quad (6)$$

Where γ(n) is a correlation sum denoted as $$\gamma(n) = \sum_{k=n}^{n+L-1} y(k)y^*(k+N) \quad (7)$$

The energy term can be denoted as $$\varepsilon(n) = \sum_{k=n}^{n+L-1} \|y(k)\|^2 + \|y(k+N)\|^2 \quad (8)$$

$\|.\|$ represents the norm of the complex sample.

The coarse timing and FFO estimates are refined to detect precise LTE frame boundaries. The FFO present in the received signal is compensated using the estimates obtained from the equation (2). The FFO compensated sample can be represented as $$y_f(n) = y(n)e^{\frac{-j2\pi\epsilon_f n}{N}} \quad (9)$$

In an embodiment, the FFO compensated samples are fed to the LPF for determining the cell search parameters.

The decimated samples of half-a-frame are considered for the detection of $N^2_{ID}$ and the length of cyclic prefix. The detection of the length of cyclic prefix is performed by examining the data with two possible lengths. The estimator starts by preparing two data sets using the same decimated samples each one for Normal and extended CP detection. NHF D are the number of samples in half a frame which are obtained after decimating. Using the number of samples, 70 or 60 OFDM symbols are prepared based on LCP since at least one PSS and SSS is present in half frame. γ1 and γ2 are the sets each containing 70 and 60 OFDM symbols corresponding to Normal and extended CPs respectively.

The $\{\Upsilon_1\}$ containing the set of OFDM symbols is prepared according to normal cyclic prefix using start of the symbol. The elements of $\Upsilon_1$ the OFDM symbols with the length of the CP of 144. Few extra CP samples in each slot is placed in the end. Thus, the cardinality of the set $\{\Upsilon_1\}$ is 70 ($\Upsilon_1$)=70.

$$\{\Upsilon_1\} = \{X_0, X_2, \ldots X_{69}\}$$

where each $X_k$ is an OFDM symbol. $X_k$ is represented as $$X_k = [p_k(0), p_k(1), \ldots, p_k(N^D + L_{CP}^D - 1)]; \text{ for } k=0,1,\ldots,69 \quad (10)$$

For determining the PSS timing and the PSS ID, each OFDM symbol of $\Upsilon_1$ is cross correlated with the plurality of time domain PSS signals generated at the receiver 104a. For example, there can be three PSS signals generated at the receiver 104a.

The time domain PSS OFDM signal from the frequency domain sequence which is placed in the centre subcarriers accordingly and is fed to IDFT is as mentioned below.

$$S_M(k) = \{\underset{-N_D/2}{0}, \underset{-N_D/2+1}{0}, \ldots, \underset{-31}{S_M(0)}, \ldots, \quad (11)$$

$$\underset{-1}{S_M(30)}, \underset{0}{0}, \underset{31}{S_M(32)}, \ldots, \underset{31}{S_M(62)}, \ldots, \underset{N_D/2-1}{0}, \underset{N_D/2}{0}\}$$

$$s_M(n) = \sum_{k=-N_D/2}^{-1} S_M(k)e^{\frac{j2\pi k n}{N_D}} + \sum_{k=1}^{N_D/2} S_M(k)e^{\frac{j2\pi k n}{N_D}} \quad (12)$$

The $s_M(n)$ signal is correlated with each $X_k$ after excluding the CP portions of the $X_k$ and the correlation sum is preserved. Similarly the same thing has to be repeated with all possible M (M={0; 1; 2} and with all k. Out of |M×?1| correlation sum outputs, the maximum sum and its location variables are obtained.

$$\Xi^1_M(k) = \frac{1}{N_D} \sum_{n=0}^{N_D-1} p_k(n) s^*_M(n) \quad (13)$$

$$\{N_{ID,1}^2, q_1\} = \underset{M,k}{\operatorname{argmax}}\{\|\Xi_M^1(k)\|^2\} \quad (14)$$

If the $p_k(n)$ is the OFDM symbol carrying PSS compensated with FFO estimate, then $$p_k(n) = \sum_{l=0}^{l=\theta} h(n-l)s_M(l) + w(n) \quad (15)$$

$\theta$ is the number channel taps. The correlation sum obtained for the index of the PSS symbol from $\Upsilon_1$.

$q_1$ is the index of $X_k$ which maximizes the correlation term resulting PSS symbol start. $N_{ID,1}^2$ is the sector ID obtained for the term_1 M(q1). Similarly the set $\Upsilon$ 2 is prepared with $N_F^{DH}$ samples according to extended CP. Thus, $\Upsilon$ 2 is equal to 60. The length of the CP 512 is to be excluded has to be excluded from the elements of $\Upsilon$ 2 which are the OFDM symbols with extended CP.

The operations performed on $\Upsilon$ 1 are repeated on $\Upsilon$ 2 for obtaining $\{N_{ID}^2\}$ using $\Xi_M^2(k)$.

$$\Xi_M^2(k) = \frac{1}{N_D} \sum_{n=0}^{N_D-1} p_k(n)s_M^*(n) \quad (16)$$

$$\{N_{ID,2}^2, q_2\} = \underset{M,k}{\operatorname{argmax}}\{\|\Xi_M^2(k)\|^2\} \quad (17)$$

The obtained correlation sums using two sets is used in identifying the sector ID, PSS timing and the length of CP from (7). The $N_{ID}^2$ and q are the detected PSS ID and the PSS symbol and $\Xi_M^i$, which I maximum provides the length of CP.

In the above described method, the IFO is not estimated. However, the presence of IFO affects the fine timing estimation. Consider the equations as mentioned below.

$$R(l) = \sum_n y(n+l)x^*(n) \quad (18)$$

where $y(n)$ is the received signal

Consider the case, where the receiver 104a is searching for PSS symbol in the presence of IFO. If the received signal $y(n)$ contains IFO along with fading channel and the AWGN the correlation term is given by $$R(l) = \sum_n e^{\frac{j2\pi\epsilon n}{N}} \left\{ \sum_p h(p)x(n+l-p)x^*(n) \right\} + \sum_n w(n)x^*(n) \quad (19)$$

$$\{\hat{\tau}, \epsilon_i, N_{ID}^2\} = \operatorname{argmax}\|R(l)\|^2$$

Timing is obtained at the point where l maximizes the correlation sum $R(l)$. In the case of flat and slow fading channel and ignoring the noise effects (assuming high SNR), the correlation sum is given by $$R(l) = \sum_n e^{\frac{j2\pi\epsilon n}{N}} \{hx(n)x^*(n)\} \quad (20)$$

Due to the presence of IFO, the correlation sum will not be a maximal term at the PSS location. It should be noted that the sum of the exponentials for the complete symbol degrades the correlation term in the presence of IFO. In order to compensate this a joint timing, IFO and SID detection is performed. There is no need to repeat this estimation every time the UE 104 moves to the vicinity of neighboring BS. The frequency differences among neighboring BS's are negligible compared with the IFO occurring at the local oscillator of the UE 104. This consideration is valid when the following two facts are taken into account. First, all neighboring BSs are connected to a master clock by satellite or optical fiber links. Second, the local oscillators operating at the BSs are usually of high accuracy by using controlled crystal oscillators so that the carrier frequencies of a few neighboring BSs vary insignificantly.

In an embodiment, the received signal is cross correlated sample by sample with the known PSS sequences with finite set of IFO hypotheses and different SIDs. The received signal after decimation is eliminated with each IFO from the hypothesized set. The IFO eliminated sequence is now cross correlated with the PSS sequences to obtain the IFO and timing.

$$\tilde{y}(n) = y_D(n)e^{\frac{-j2\pi\mu n}{N_D}} \quad (21)$$

$y_D(n)$ is the decimator output of received signal. l is an element from the hypothesized set $\{-2, -1, 0, 1, 2\}$. 'µ' denotes the number of hypothesis (which is considered to be 5). The obtained $\tilde{y}(n)$ is correlated with the time domain PSS sequence $s_M(n)$ to detect the IFO and timing.

$$\Gamma(l) = \sum_n \tilde{y}(n+l)x^*(n) \quad (22)$$

$$\{\hat{\tau}, \epsilon_i, N_{ID}^2\} = \underset{l,i,M}{\operatorname{argmax}}\|\Gamma(l)\|^2 \quad (23)$$

Once the SID and the PSS symbol location is determined, the samples of the corresponding OFDM symbol is used to estimate FFO. The PSS-based frequency offset estimation is initiated by compensating the IFO estimated to the received signal.

After the IFO compensation, the uncertainty span of the FFO is [−0.5, 0.5] which could any real number. $N_f$ finite equally spaced frequency offset hypotheses that span the uncertainty of the FFO is considered for the frequency offset estimation. For each hypothesis test, corresponding amount of offset is removed from the samples and correlated with the PSS time domain signal. A hypothesis corresponding to the maximum of the correlation sum calculated is selected.

The span of $N_f$ is first divided in to finite hypotheses as $N = \{N_F^0, N_F^1, \ldots, N_F^{K-1}\}$. Now each hypothesis is considered to determine the maximum correlation energy. The following steps are performed.

1. A set of finite number (say k) hypotheses from the uncertainty span of FFO is prepared.

2. Check the correlation sum by removing an amount equal to each of the offsets in the hypotheses and obtain the offset which maximizes the correlation sum.
3. New set of hypotheses is prepared based on the maximizing offset and its neighboring terms. Consider that the N F maximizes energy then the span of $[N_F^1, N_F^3]$. The steps 2 and 3 are repeated to obtain the timing estimate.

In order to detect the BS ID, UE has to successfully identify the GID ($N_{1ID}$). Once UE is able to estimate SSS ID correctly, cell search and synchronization process is complete. Any leftover (residual) timing and frequency offsets can be compensated during the tracking mode using the pilots. GID detection can be done either on coherent or non-coherent detection methods. Coherent detection is possible using the channel that can be estimated from the PSS symbol since both PSS and SSS occupy the same set of subcarriers but in different symbols. Coherent detection relies on the assumption that channel doesn't change between two symbols of PSS and SSS.

Figure 2:
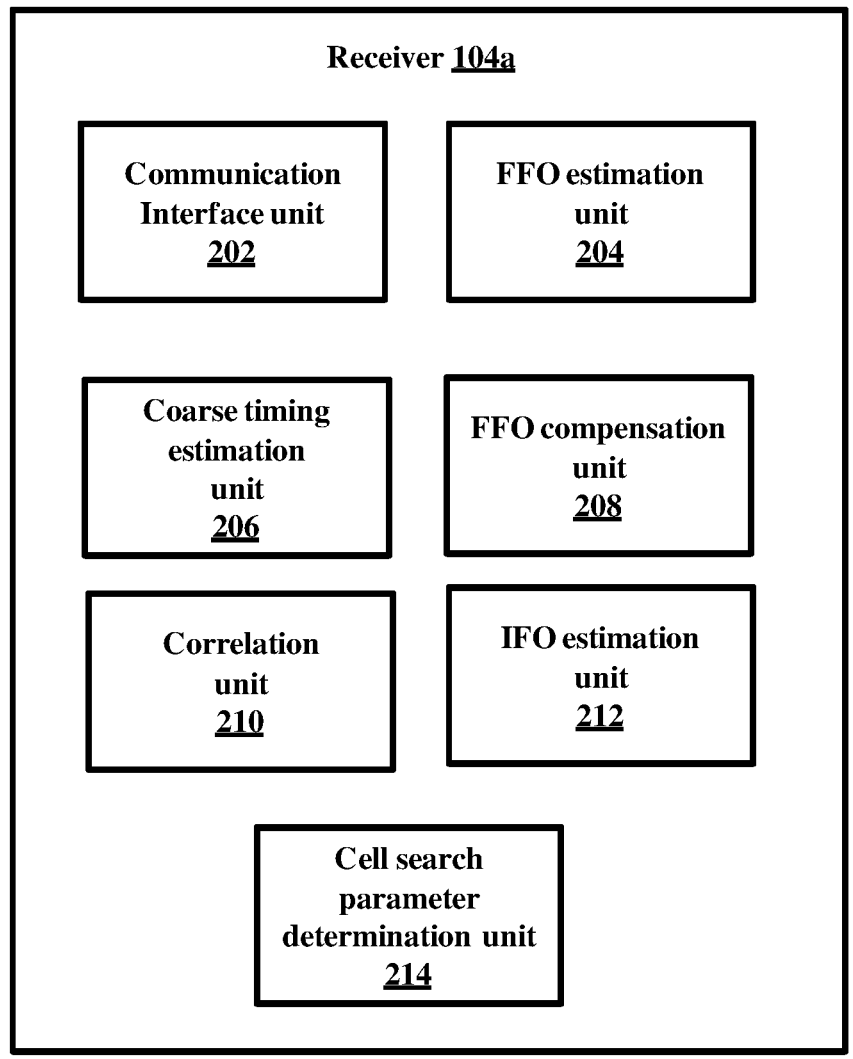
FIG. 2 illustrates various units in a receiver of the UE described in the FIG. 1, according to the embodiments as disclosed herein.

FIG. 2 illustrates various units in a receiver 104a of the UE 104 described in the FIG. 1, according to the embodiments as disclosed herein. As depicted in the FIG. 2, the receiver 104a includes a communication interface unit 202, a FFO estimation unit 204, coarse timing estimation unit 206, FFO compensation unit 208, a correlation unit 210, IFO estimation unit 212 and a cell search parameters determination unit 214.

The communication interface unit 202 receives the signal from the base station 102. The received signal is the OFDM modulated signal obtained by placing the symbols X(k) on subcarrier k. Each X(k) could be any complex modulated symbol and the OFDM modulation over X(k) is accomplished by 'N' point IFFT. The value of 'N' depends on the system bandwidth. For example, y(n) is the received signal (or samples) at the communication interface unit 202 for over a period of 5 msec. The received signal at every 5 msec data contains at least one PSS and one SSS.

The FFO estimation unit 204 estimates the FFO in the received signal. In an embodiment, the maximum likelihood (ML) estimator is used for FFO estimation of an OFDM based system.

The coarse timing estimation unit 206 estimates the coarse timing in the received signal. The coarse timing is estimated using CP in the received signal. The redundancy present in each symbol in terms of CP is used to estimate the coarse timing. The channel is assumed to be constant within one OFDM symbol in case of extended CP. The timing estimate of an OFDM symbol in the frame and FFO in the received signal is estimated using the ML estimator. The FFO and coarse timing is estimated using the CP.

The FFO compensation unit 208 compensates the received signal with the estimated FFO. The FFO estimated in the received signal is compensated based on the FFO estimated using the equation (9). The IFO estimation unit 210 estimates the IFO in the received signal. In an embodiment, the received signal is the received signal is cross correlated sample by sample with the known PSS sequences with finite set of IFO hypotheses such as $\{-2, -1, 0, 1, 2\}$. The received signal after decimation is eliminated with each IFO from the hypothesized set. The IFO eliminated sequence is now cross correlated with the PSS sequences to obtain the IFO.

The cell search parameters determination unit 212 determines the cell search parameters such as the PSS ID, the PSS timing, a length of CP and a mode of operation of the cell.

Figure 3:
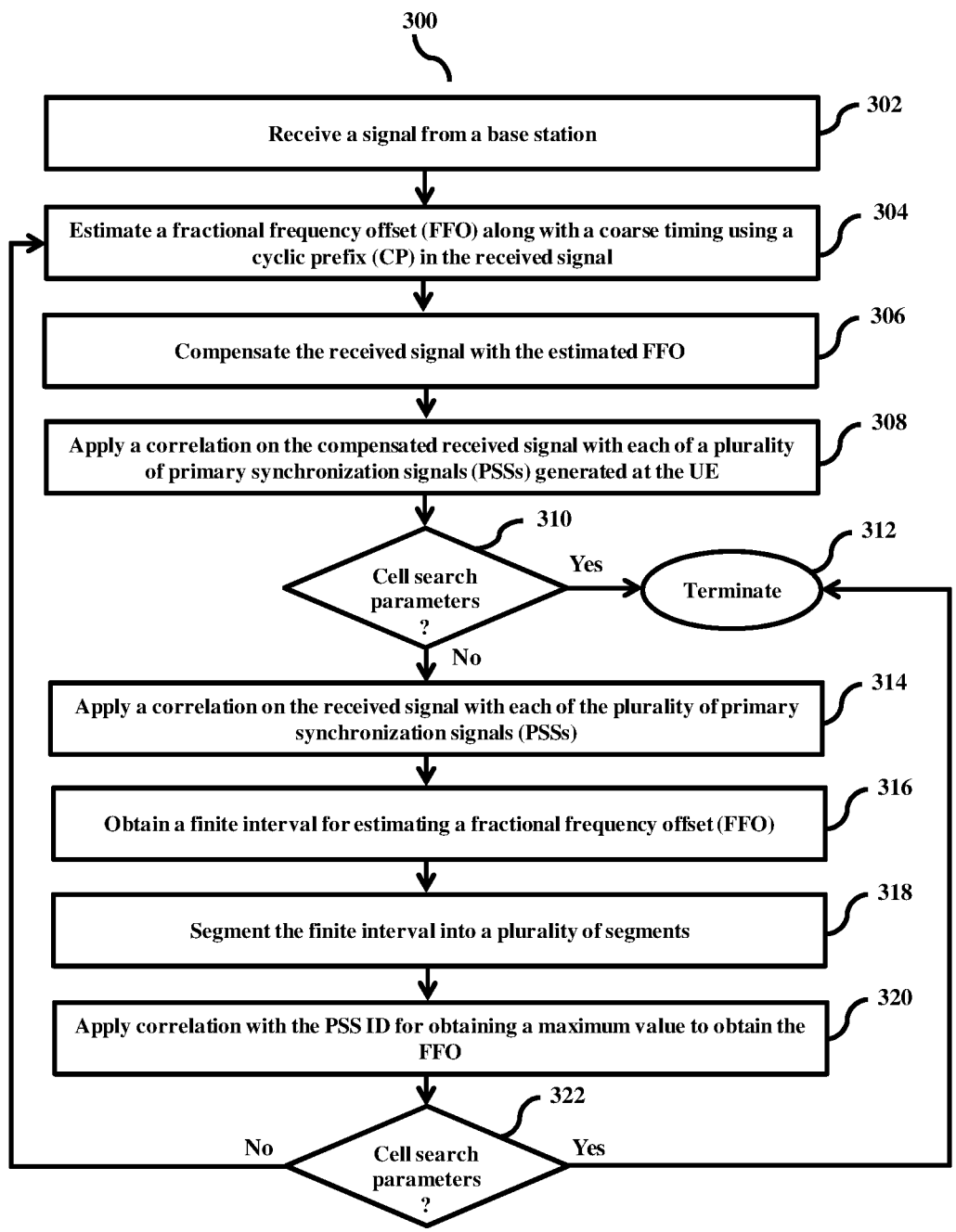
FIG. 3 is a flow diagram illustrating a method of performing the cell search by the UE, according to the embodiments as disclosed herein.

FIG. 3 is a flow diagram 300 illustrating a method of performing the cell search by the UE 102, according to the embodiments as disclosed herein. At step 302, the method includes receiving the signal from the base station 102. The method 300 allows the communication interface unit 202 to receive the signal from the base station 102. The transmitted signal of the target BS x(n) is OFDM modulated signal obtained by placing the symbols X(k) on subcarrier k. Each X(k) could be any complex modulated symbol and the OFDM modulation over X(k) is accomplished by 'N' point IFFT. For example, y(n) is the received signal (or samples) at the communication interface unit 202 for over a period of 5 msec. The received signal at every 5 msec data contains at least one PSS and one SSS.

At step 304, the method includes estimating the FFO along with a coarse timing using a cyclic prefix (CP) in the received signal. The method allows the FFO estimation unit 204 to estimate the FFO along with the coarse timing using CP. Further, the method allows the coarse timing estimation unit 206 to estimate the coarse timing. In an embodiment, the maximum likelihood (ML) estimator is used for FFO estimation of an OFDM based system. The coarse timing estimation unit 206 estimates the coarse timing in the received signal. The coarse timing is estimated using CP in the received signal. The redundancy present in each symbol in terms of CP is used to estimate the coarse timing. The channel is assumed to be constant within one OFDM symbol in case of extended CP. The timing estimate of an OFDM symbol in the frame and FFO in the received signal is estimated using the ML estimator.

At step 306, the method includes compensating the received signal with the estimated FFO. The method allows the FFO compensation unit 208 to compensate the received signal with the estimated FFO. The FFO estimated in the received signal is compensated based on the FFO estimated using the equation ( ). The estimated FFO is eliminated from y(n) to obtain $y_d(n)$.

Consider $$y_d(n) = \{-1.3499, 3.0349, 0.7254, -0.0631, 0.7147,\\
-0.2050, -0.1241, 1.4897, 1.4090, 1.4172, 0.6715,\\
-1.2075, 0.7172, 1.630, 0.4889, 1.0347, 0.7269,\\
-0.3034, 0.2939, -0.7873, 0.8884, -1.1471,\\
-1.0689, -0.8095, -2.9443, 1.4384, 0.3252, -0.7549,\\
1.3703, -1.7115\}$$

At step 308, the method includes applying the correlation on the compensated received signal with each of a plurality of primary synchronization signals (PSSs) generated at the UE 104. The method 300 allows the correlation unit 210 to apply the correlation on the compensated received signal with each of a plurality of primary synchronization signals (PSSs) generated at the UE 104. Consider that the length of CP is 2 and OFDM symbol size is 4, i.e., for every 6 samples first two are CP samples. So those corresponding first two of every 6 samples are removed and the matrix is formed as mentioned below. The matrix $y_{d1}$ is $$y_{d1} = \begin{Bmatrix} 0.7254 & 1.4090 & 0.4889 & 0.8884 & 0.3252 \\ -0.0631 & 1.4172 & 1.0347 & -1.1471 & -0.7549 \\ 0.7147 & 0.6715 & 0.7269 & -1.0689 & 1.3703 \\ -0.2050 & -1.2075 & -0.3034 & -0.8095 & -1.7115 \end{Bmatrix}$$

For example, the PSS sequences generated at the UE can be mentioned as $$p = \begin{bmatrix} 1 & -1 & 2 & 1 \\ -1 & 2 & 3 & 1 \\ 2 & 3 & 1 & -1 \end{bmatrix}$$

In the above matrix 'P', it should be noted that the first row denotes the first PSS sequence, second row denotes the second PSS sequence and the third row denotes the third PSS sequence. Each row of the matrix is a PSS sequence, which includes a PSS ID.

Further, each row of the matrix 'p' is correlated with the $y_d$ i.e a new matrix is obtained by the product of conj $(p)^*y_{d1}$. Consider the product matrix as S1 (with size 3×5) which can be given as $$S1 = P^* y_{d1}$$

In an embodiment, another matrix is formed using the sequence $y_d(n)$, for the length of CP as 6. For every 10 samples first 6 samples correspond to CP and the remaining 4 samples are original samples. Removing first 6 samples for every 10 samples, another matrix $y_{d2}$ can be obtained as $$y_{d2} = \begin{Bmatrix} -0.1241 & 0.7269 & 0.3252 \\ 1.4897 & -0.3034 & -0.7549 \\ 1.4090 & 0.2939 & 1.3703 \\ 1.4172 & -0.7873 & -1.7115 \end{Bmatrix}$$

Each row of matrix 'p' is correlated with the $y_d$ i.e a new matrix is obtained by the product of conj $(p)^*y_{d2}$. Consider the product matrix as S2 (with size 3×3) which can be given as $$S2 = P^* y_{d2}$$

At step 310, the method includes determining the cell search parameters. The method allows the cell search parameter determination unit 210 to determine the cell search parameters. From the matrices S1 and S2, the maximum value and the position id associated with the maximum value is determined for obtaining the PSS ID, PSS timing and the length of the CP. The mode of operation of the cell (i.e., TDD/FDD is determined using SSS location.

At step 312, the method is terminated. In case, the cell search parameters are determined at step 310, the method terminates at the step 312.

At step 314, the method includes applying correlation on the received signal with each of the plurality of PSSs. The method 300 allows the correlation unit 210 to apply the correlation on the received signal with each of the plurality of PSSs to eliminate each value from a candidate set of values considered for integer frequency offset (IFO). The received signal y(n) is down sampled to get $y_d(n)$. However, the down sampled signal $y_d(n)$ is not compensated with FFO. Consider a candidate set of values for IFO as {-2,-1,0,1,2}. Initially eliminate an IFO of -2 from $y_d(n)$.

Consider the 'p' matrix to cross correlate with the $y_d(n)$ sequence. Each time one row of p is obtained and correlated with $y_d(n)$. Cross correlation for the first row of p matrix and $y_d(n)$ is obtained as $$V(d) = \{-2.9971, 2.8982, 2.0130, -1.3119, \ldots, 2.1092\}$$

Further, the second row of 'p' and third row of p is correlated with $y_d(n)$. Now the matrix V is obtained with size 3×27, since the size of $y_d(n)$ is 1×30.

In a similar manner, the values -1, 0, 1 and 2 are eliminated from the candidate set of values. The correlation results in third dimension of matrix 'V' are stored. Thus, the size of 'V' matrix is 3×27×5. From the matrix, maximum value and the position associated with the maximum value is obtained. The PSS ID and PSS timing are determined from the maximum value and the position associated with the maximum value. Further, the IFO is identified as the value for which the maximum value and the position associated with the maximum value are determined in the matrix V. The PSS timing is refined using the non down-sampled PSS sequence.

At step 316, the method includes obtaining a finite interval for estimating the FFO. The method allows the FFO estimation unit 204 to obtain the finite time interval for estimating the FFO. The FFO is estimated, for example with the interval [-0.5, 0.5].

At step 318, the method includes segmenting the finite interval into a plurality of segments. The interval is segmented to five segments such as {-0.5,-0.25,0.0.25,0.5}.

At step 320, the method includes applying correlation with the PSS ID for obtaining a maximum value to obtain the FFO. The method allows the correlation unit 210 to apply correlation with the PSS ID for obtaining a maximum value to obtain the FFO. Each time an amount of one candidate of FFO is eliminated and correlated with the known PSS and maximum correlation value is obtained. Using the neighbor elements of the set another new set is prepared and the correlation process is repeated. For example, if 0.25 is obtained as maximum correlation value then using 0 and 0.5, a new set {0, 0.125, 0.25, 0.375, 0.5} is prepared and the correlation process is repeated. The length of CP and mode is determined based on the SSS location At step 322, the method includes determining the cell search parameters. The method allows the cell search parameter determination unit 214 to determine the cell search parameters. Thus with the proposed method 300, the cell search parameters such as PSS ID, PSS timing, the length of the CP and mode of operation of the cell are determined.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4:
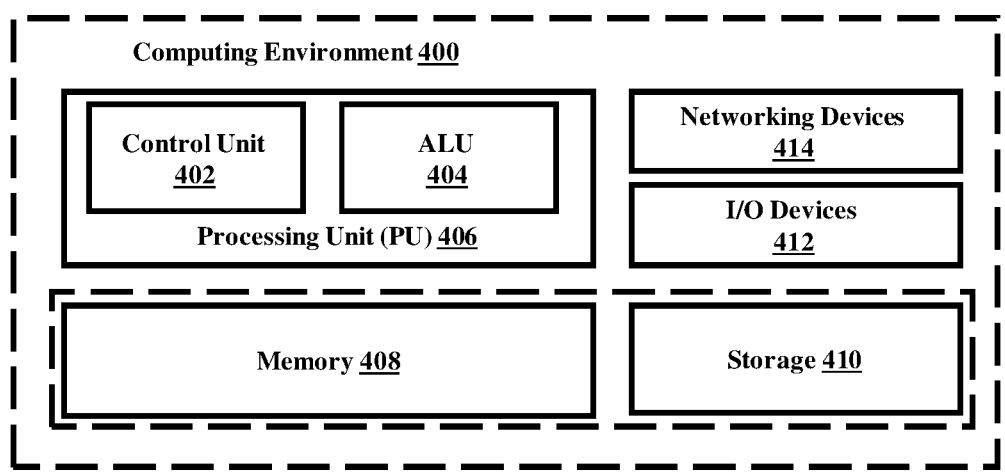
FIG. 4 illustrates a computing environment implementing the method of performing cell search by the UE, according to the embodiments as disclosed herein.

FIG. 4 illustrates a computing environment implementing the method of performing cell search by the UE, according to the embodiments as disclosed herein. As depicted in the FIG. 4, the computing environment 400 comprises at least one processing unit 406 that is equipped with a control unit 402 and an Arithmetic Logic Unit (ALU) 404, a memory 408, a storage unit 410, plurality of networking devices 414 and a plurality of Input output (I/O) devices 412. The processing unit 406 is responsible for processing the instructions of the algorithm. The processing unit 406 receives commands from the control unit 402 in order to perform its processing. Further, any logical and arithmetic operations involved in the execution of the instructions are computed with the help of the ALU 404.

The overall computing environment 400 can be composed of multiple homogeneous and/or heterogeneous cores, multiple CPUs of different kinds, special media and other accelerators. The processing unit 406 is responsible for processing the instructions of the algorithm. Further, the plurality of processing units 406 may be located on a single chip or over multiple chips.

The algorithm comprising of instructions and codes required for the implementation are stored in either the memory unit 408 or the storage 410 or both. At the time of execution, the instructions may be fetched from the corresponding memory 408 or storage 410, and executed by the processing unit 406.

In case of any hardware implementations various networking devices 414 or external I/O devices 412 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 4 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should be and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method of performing a cell search by a user equipment (UE), the method comprising:
    receiving a signal from a base station;
    estimating a fractional frequency offset (FFO) along with a coarse timing using a cyclic prefix (CP) in the received signal;
    compensating the received signal with the estimated FFO;
    applying a correlation on the compensated received signal with each of a plurality of primary synchronization signals (PSSs) generated at the UE;
    determining a plurality of cell search parameters based on the applied correlation;
    determining that the plurality of cell search parameters are unavailable;
    applying a correlation on the received signal with each of the plurality of primary synchronization signals (PSSs) to eliminate each value from a candidate set of values considered for integer frequency offset (IFO) to determine IFO; and
    determining the plurality of cell search parameters based on the correlation.

2. The method of claim 1, wherein the cell search parameters include a PSS ID, PSS timing, a length of CP and a mode of operation of the cell.

3. The method of claim 2, wherein the PSS ID is determined by identifying a maximum value, wherein the PSS timing is determined by identifying a position associated with the maximum value.

4. The method of claim 3, identifying the maximum value and the position associated with the maximum value comprises:
    forming a matrix by correlating the received signal with each of the PSSs with a value among the candidate set of values;
    applying the correlation on the received signal with each of the PSSs with each value among the set of values; and
    placing samples obtained from each correlation in the matrix.

5. A user equipment (UE) for performing a cell search, the UE comprising a receiver configured to:
    receive a signal from a base station;
    estimate a fractional frequency offset (FFO) along with a coarse timing using a cyclic prefix (CP) in the received signal;
    compensate the received signal with the estimated FFO;
    apply a correlation on the compensated received signal with each of a plurality of primary synchronization signals (PSSs) generated at the UE;
    determine a plurality of cell search parameters based on the applied correlation;
    determine that the plurality of cell search parameters are unavailable;
    apply a correlation on the received signal with each of the plurality of primary synchronization signals (PSSs) to eliminate each value from a candidate set of values considered for integer frequency offset (IFO) to determine IFO; and
    determine the plurality of cell search parameters based on the correlation.

6. The UE of claim 5, wherein the cell search parameters include a PSS ID, PSS timing, a length of CP and a mode of operation of the cell.

7. The UE of claim 6, wherein the wherein the PSS ID is determined by identifying a maximum value, wherein the PSS timing is determined by identifying a position associated with the maximum value.

8. The UE of claim 7, wherein the receiver is configured to identify the maximum value and the position associated with the maximum value by:
    forming a matrix by correlating the received signal with each of the PSSs with a value among the candidate set of values;
    applying the correlation on the received signal with each of the PSSs with each value among the set of values; and
    placing samples obtained from each correlation in the matrix.

* * * * *